May 18, 1965   H. J. SOLOMON   3,184,624
ARRANGEMENT OF COOLING CHANNELS IN A DYNAMOELECTRIC MACHINE
Filed Nov. 19, 1962   2 Sheets-Sheet 1

United States Patent Office 3,184,624
Patented May 18, 1965

3,184,624
ARRANGEMENT OF COOLING CHANNELS IN A DYNAMOELECTRIC MACHINE
Henry Joseph Solomon, Stanmore, Middlesex, England, assignor to Rotax Limited, London, England
Filed Nov. 19, 1962, Ser. No. 238,447
Claims priority, application Great Britain, Nov. 28, 1961, 42,444/61
3 Claims. (Cl. 310—54)

This invention relates to dynamoelectric machines of the kind including a casing, a stator carried by the casing, a shaft mounted for rotation within the casing a field tube mounted concentrically about the shaft for rotation therewith, a spider formed from magnetic material, said spider being mounted on the shaft with its free ends located within apertures in the periphery of the field tube in spaced relationship to the edges of the apertures, a pair of field windings surrounding the shaft at opposite sides of the spider, an inlet in the casing for connection to a source of coolant, a first chamber in the vicinity of the one winding, a second chamber in the vicinity of the other winding, an outlet in the casing in communication with the first chamber, first passage means interconnecting the inlet and second chamber, said first passage means including a helical portion extending throughout substantially the whole length of the alternator casing, and second passage means interconnecting the second and first chambers, the second passage means including a helical portion extending throughout substantially the whole length of the alternator casing.

The object of the invention is to provide such a machine in a convenient form.

According to the invention, in a dynamolectric machine of the kind specified the casing includes an inner part and an outer part, one of said parts having formed in its face helical grooves which are closed by the other part to define the helical portions of said first and second passage means.

Preferably, the coolant is a lubricant and the passage means include branch portions through which the lubricant is fed to the shaft bearings.

In the accompanying drawings.

Figure 1:
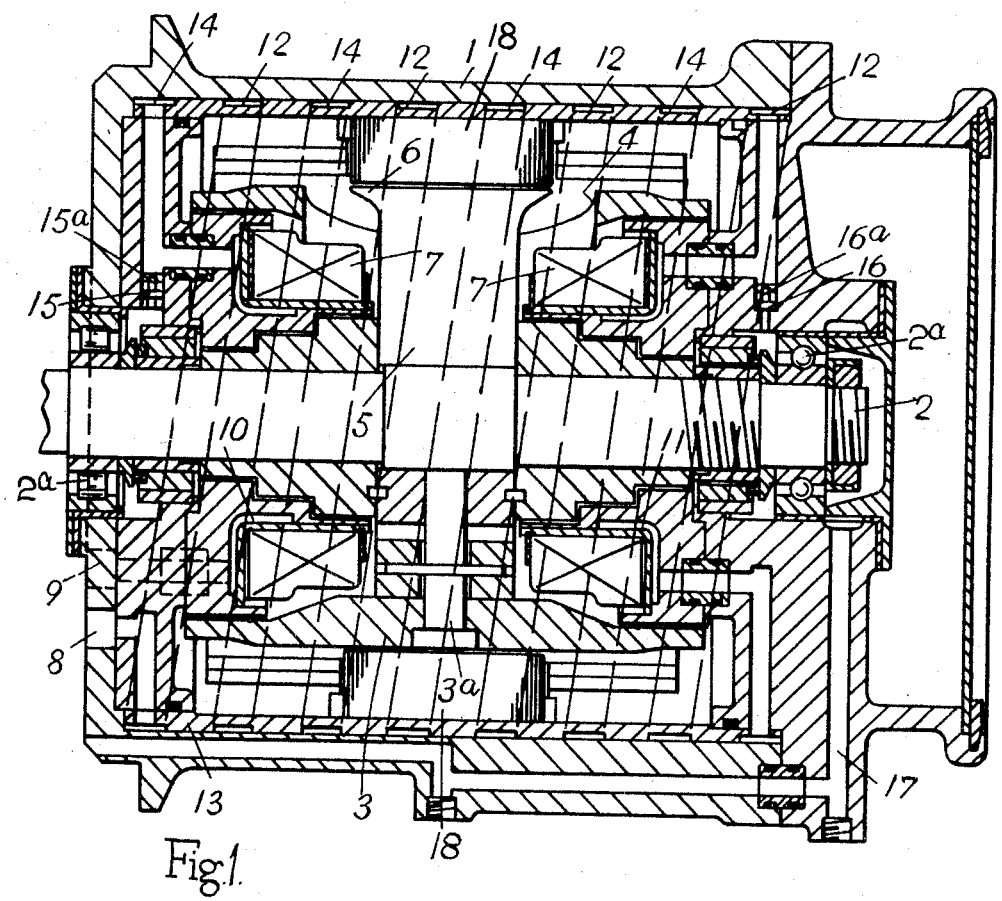
FIGURE 1 is a sectional side view of an alternator embodying the invention
Figure 3:
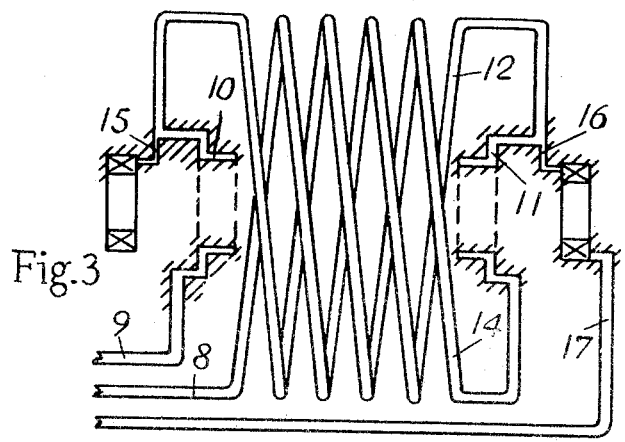
FIGURE 3 is a diagram showing the flow path of the coolant through the alternator shown in FIGURES 1 and 2.
Figure 2:
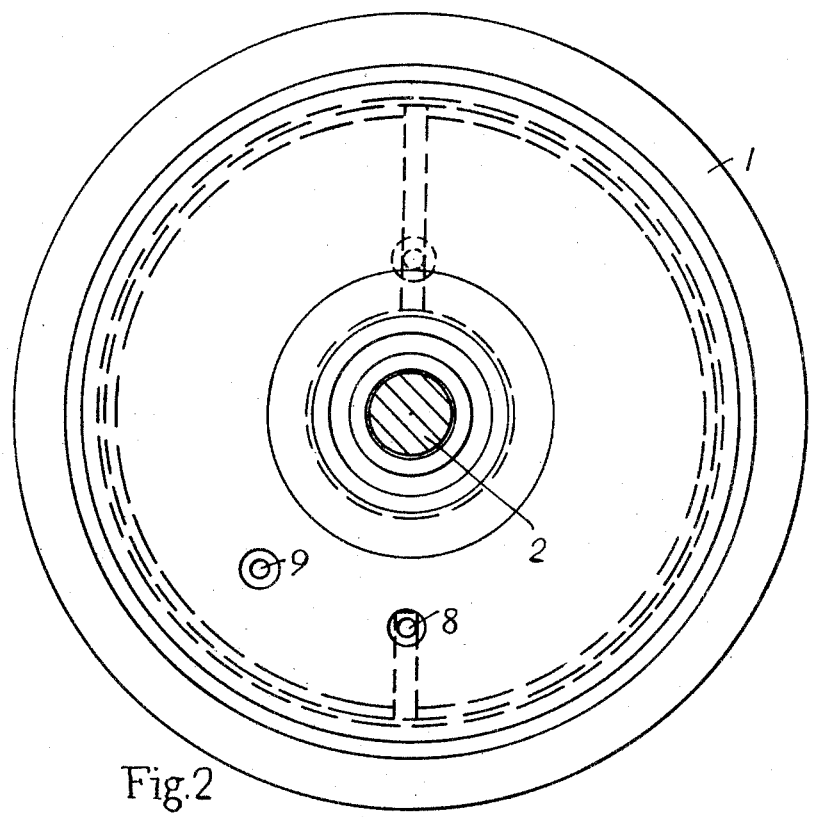
FIGURE 2 is an end view of the alternator shown in FIGURE 1.

Referring to the drawings there is provided an alternator comprising an outer casing 1 within which is a shaft 2 journalled in the bearings 2a. Secured to the shaft by bolts 3a is a rotor in the form of a cylindrical tube 3 having in its periphery angularly spaced apertures 4, whilst keyed to the shaft is a spider 5 formed from magnetic material and having its pole tips 6 situated respectively within the apertures 4 but spaced from the edges thereof. Moreover, adjacent opposite ends respectively of the shaft the latter is surrounded by a pair of field windings 7 for magnetising purposes. The casing carries an annular stack of laminations 18 having slots for the reception of stator windings (not shown).

Alternators of the type above described are well known and an example of such a generator is described in pending application Serial No. 200,504.

In applying the invention to such an alternator, there are formed in the alternator casing 1 an inlet 8 adapted for connection to a source (not shown) of coolant in the form of a lubricant, and an outlet 9 adapted for connection to a drain (not shown). The outlet 9 is connected to an annular chamber 10 in the vicinity of one of the windings 7, whilst a further annular chamber 11 in the vicinity of the other winding 7 is connected to the inlet 8 through a passage means 12. This passage means 12 includes a portion defined between the outer casing 1 and an inner casing 13. The inner casing is formed with a helical groove on its outer periphery thus forming a convenient passage for the lubricant.

The chambers 10 and 11 are interconnected through passage means 14 which also includes a portion formed by a helical groove on the inner part 13 of the alternator casing. The arrangement is therefore such that the lubricant traverses a sinuous path between the inlet 8 and the outlet 9, so as to make good use of its cooling properties.

A further pair of passages 15, 16 allow lubricant to be fed to the adjacent shaft bearings the lubricant draining from the bearing supplied by the passage 16 returning to drain via a passage 17 in the casing whilst the oil draining from the bearing supplied by the passage 15 drains into the adjacent casing (not shown) to which the alternator is secured. Conveniently the passages 15, 16 are provided with restrictions 15a and 16a respectively to limit the amount of oil supplied to the bearings.

Having thus described my invention what I claim as new and desire to secure by Letters Patent is:

1. A dynamoelectric machine comprising in combination a casing, a stator carried by the casing, a shaft, bearings mounting the shaft for rotation within the casing, a field tube concentrically mounted about the shaft for rotation therewith, a spider formed from magnetic material, means mounting the spider on the shaft with its free ends located within apertures respectively in the periphery of the field tube in spaced relationship to the edges of said apertures, a pair of field windings surrounding the shaft at opposite sides of the spider, a lining having its external peripheral surface in contact with the internal peripheral surface of the casing, a pair of helically extending grooves formed in one of said contacting surfaces, a coolant inlet in the casing, a first chamber in the vicinity of one of the pair of windings, a second chamber in the vicinity of the other of said pair of windings, a coolant outlet in the casing in communication with the first chamber, first passage means including one of said grooves interconnecting the inlet with the second chamber, and second passage means including the other of said grooves interconnecting the first and second chamber.

2. A dynamoelectric machine as claimed in claim 1 in which the grooves extend helically throughout substantially the whole length of the alternator casing.

3. A dynamoelectric machine comprising in combination a casing, a stator carried by the casing, a shaft, bearings mounting the shaft for rotation within the casing, a field tube concentrically mounted about the shaft for rotation therewith, a spider formed from magnetic material, means mounting the spider on the shaft with its free ends located within apertures respectively in the periphery of the field tube in spaced relationship to the edges of said apertures, a pair of field windings surrounding the shaft at opposite sides of the spider, a lining having its external peripheral surface in contact with the internal peripheral surface of the casing, a pair of helically extending grooves formed in one of said contacting surfaces, a coolant inlet in the casing, a first chamber in the vicinity of one of the pair of windings, a second chamber in the vicinity of the other of said pair of windings, a coolant outlet in the casing in communication with the first chamber, first passage means including one of said grooves interconnecting the inlet with the second chamber, second passage means including the other of said grooves interconnecting the first and second chambers and a pair of branch passages interconnecting the first and second passage means respectively with the bearings.

References Cited by the Examiner
UNITED STATES PATENTS

| | | | |
|---|---|---|---|
| 2,796,542 | 6/57 | Bekey | 310—162 |
| 2,894,155 | 7/59 | Labastie | 310—54 |

MILTON O. HIRSHFIELD, *Primary Examiner.*

DAVID X. SLINEY, *Examiner.*